Feb. 21, 1939.   G. L. WILLIAMS   2,148,313
COMBINED REDUCTION AND REVERSING GEARING
Filed April 8, 1936

INVENTOR.
GEORGE L. WILLIAMS
BY Harris G. Luther
ATTORNEY

Patented Feb. 21, 1939

2,148,313

UNITED STATES PATENT OFFICE 2,148,313

COMBINED REDUCTION AND REVERSING GEARING

George L. Williams, Hartford, Conn., assignor to United Aircraft Corporation, East Hartford, Conn., a corporation of Delaware Application April 8, 1936, Serial No. 73,287

5 Claims. (Cl. 74—305)

This invention relates to improvements in combined reduction and reversing gearing for driving two rotating bodies in opposite directions at a speed different from the speed of the driving power plant.

The invention has particular application to gearing for driving coaxial oppositely rotating aeronautical propellers where both are driven by the same engine and has for an object the provision of a combined reduction and reversing gearing of the character described wherein the tooth loads on the various gears are maintained at an unusually low value.

A further object resides in the provision of a system of gearing of the character described which is light in weight and occupies a small space so that it may be conveniently disposed within the front portion of an internal combustion engine of the type usually employed for the propulsion of airplanes.

Other objects and advantages will be more particularly pointed out or will become apparent as the description proceeds.

In the accompanying drawing, in which like reference numerals are used to designate similar parts throughout, there is illustrated a suitable mechanical embodiment of what is now considered to be the preferred form of the invention. The drawing, however, is for the purpose of illustration only and should not be taken as limiting the invention, the scope of which is to be measured entirely by the scope of the appended claims.

Figure 1:
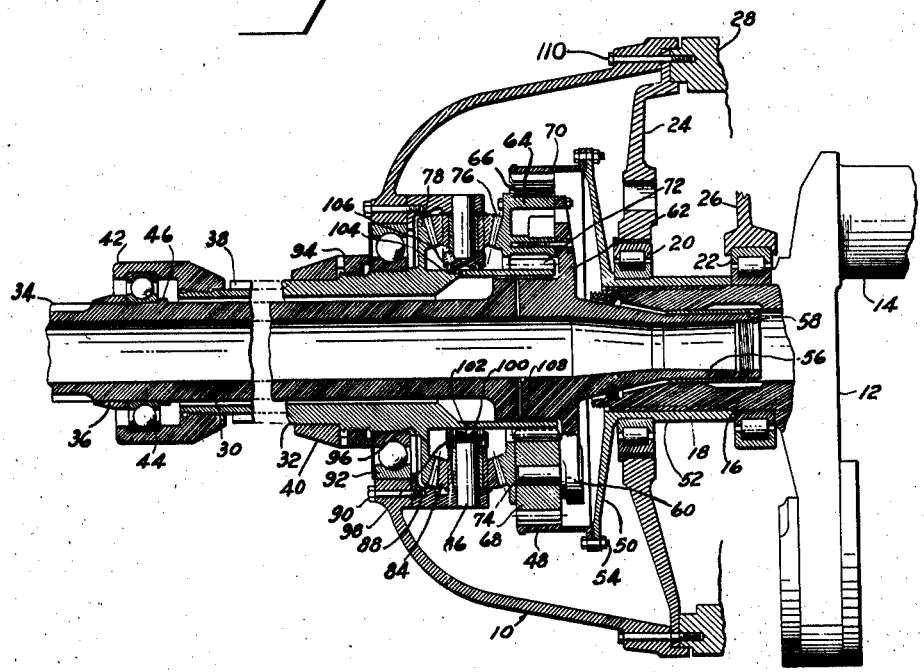
Fig. 1 is a longitudinal sectional view of the front portion of an engine, and a reversing gear unit constructed according to the idea of this invention.

Referring to the drawing in detail, the numeral 10 generally indicates the front portion or nose section of an engine such as a radial internal combustion engine conventionally employed for the propulsion of airplanes. This nose section serves as a casing for the combined reduction and reversing gear unit and also serves as a load transferring member for receiving the thrust developed by the propellers and transmitting this thrust to the engine, from which it is transmitted to the airplane. The numeral 12 designates the engine crankshaft which is provided with a crank 14 and a hollow front end 16 formed with external splines 18. The front end of the crankshaft is supported in antifriction bearings 20 and 22 which are seated in partition members 24 and 26 respectively secured to the engine crankcase 28.

The two oppositely rotating propellers are supported upon and driven by propeller shafts 30 and 32. Both of these shafts are coaxial and the shaft 32 is constructed as a sleeve which surrounds a portion of the hollow inner shaft 30. Both shafts extend forwardly from the front portion of the engine and support the two propellers in cantilever relation.

At its forward end the shaft 30 is provided with a set of external splines 34 for maintaining the propeller which it carries against rotation with respect thereto, and with an annular wedge member 36 for receiving and centering the rear end of the propeller hub. A similar wedge member centers the front end of the propeller hub and retains the propeller upon the shaft through the medium of a nut screw threaded upon the end of the shaft and bearing against the wedge member. As such devices for securing propellers upon propeller shafts are old and well known in the art, it is believed that a detailed description or illustration thereof is not necessary for the purpose of this disclosure.

The outer shaft 32 which carries the rear propeller is also provided with splines 38 and with a rear annular wedge member 40 for centering the rear end of the propeller hub. The propeller is retained upon the shaft and the forward end thereof centered with respect to the shaft by means of a combined nut and wedge member 42 screw threaded upon the forward end of the shaft 32. This member 42 is provided with a forwardly extending portion which overlies and receives the outer race of an anti-friction thrust bearing 44 disposed between the shafts 30 and 32, the inner race of this bearing being secured between the annular wedge member 36 and an annular shoulder 46 formed on the exterior of the inner shaft 30. This bearing 44 restrains the two shafts 30 and 32 against radial or axial movement with respect to each other while permitting free relative rotation.

While the nut and wedge element 42 has been illustrated as a single piece, it is obvious that this member may be divided into a plurality of separate elements if desired, and may be provided with suitable shoulders or other means to definitely determine its assembled position with respect to the shaft 32 and the bearing 44.

Formerly the general practice was to mount the propeller directly upon the engine shaft and hence to drive the propeller at the same speed as the engine, but it has been found that material advantages are obtained by driving the propeller at a slower speed than the operating speed of the engine and for this reason it is the present practice, especially in the case of engines of large power output, to interpose a suitable reduction gear between the engine crankshaft or drive shaft and the propeller shaft. In the case of two propellers mounted to rotate in opposite directions about the same axis, it is also necessary to provide suitable means for giving to one of the propellers a direction of rotation opposite to the direction of rotation of the engine. Furthermore, particularly in the case of military airplanes, it is highly desirable that the rotation of both propellers be accurately timed in order that a machine gun may be fired through the propeller disc without interference between the projectiles and the propeller blades. The present combined reduction and reversing gear unit accomplishes these various results and at the same time has the advantages of light weight, small volume and low tooth loading as set forth in the objects as stated above.

An external ring gear 48 is mounted upon the forward end of the drive shaft 12 by means of a bell housing 50 having a tubular shaft portion 52 provided with internal splines which engage with the splines 18 and extending rearwardly to a location in which it bears against the forward face of the inner race of the anti-friction bearing 22. The inner race of the anti-friction bearing 20 is carried by the shaft portion 52 of the bell housing and is located upon this shaft portion by means of suitable annular shoulders or other means. For purposes of manufacture and assembly the external ring gear 48 is made separately from the bell housing 50 and is connected thereto by suitable means such as the bolts 54.

The propeller shaft 30 is provided at its rear end with a reduced portion 56 which extends within the hollow forward portion 16 of the crankshaft 12 to provide a spigot bearing between these two coaxial shafts; preferably, a plain bearing 58 is interposed between the rear end of the shaft 30 and the forward end of the crankshaft 12. Intermediate its length the shaft 30 is provided with a plurality of outwardly extending arms 60 connected by outwardly extending flange portions 62 to provide one side of a gear carrying cage generally indicated as 64. This cage portion may either be formed integrally with the shaft 30 or may be made separately and rigidly secured thereon as may be desired for convenience in manufacture and assembly. The cage is completed by means of a forward portion 66 bolted or otherwise suitably secured to the rear portion 62.

The cage 64 carries a plurality of radially spaced spur planetary gears, one of which is indicated at 68. These gears 68 are provided with gear teeth which engage with teeth 70 provided around the interior of the ring gear 48 and at the same time engage with teeth 72 provided upon the rear end of the outer propeller shaft 32 or upon a sun gear member rigidly secured to the rear end of this shaft.

From the above description it will be observed that as the crankshaft 12 rotates the ring gear 48, a driving force will be applied to the radially outward portion of each of the planetary spur gears 68. This force will be transmitted to the pins, one of which is indicated at 74, which support the gears upon the cage 64 and will cause the cage and the shaft 30 to tend to rotate in the same direction of rotation as the ring gear 48 at a reduced speed. The reaction to the force applied to the pin 74 is transmitted by the radially inward portions of the planetary spur gears 68 to the gear teeth 72 and this reaction force will cause the outer propeller shaft 32 to tend to rotate in a direction opposite to the direction of rotation of the shaft 30. Thus, this much of the gear unit would cause the two propellers to be driven in opposite directions with respect to each other. This, however, would be a primary differential drive and the speeds of the two propellers would be variable and proportional to the power absorbed by each and the rotation would therefore not be definitely timed.

The cage 64 is provided with an annular bevel gear 76 and the shaft 32 is provided with a similar annular bevel gear 78 which faces the gear 76. If it is desired that the two propellers as indicated at 80 and 82 in Fig. 2 rotate at the same speed the gears 76 and 78 will have the same radius, but, if it should be desired that the two propellers should rotate at different speeds, the radii of the gears 76 and 78 will be proportioned accordingly. In the form of the invention illustrated, it has been assumed that the two propellers will rotate at the same speed and the gears 76 and 78 have therefore been illustrated as having the same radius and, for convenience, this form of invention will be particularly described, it being understood that the invention is not specifically limited to a construction in which the two propellers rotate at exactly the same speed.

Between the gears 76 and 78 there is provided a plurality of beveled pinion gears 84 mounted to rotate on fixed pins 86 mounted in a fixed cage 88 secured at the forward end of the gear casing 10 by suitable means such as the cap screws 90. The gears 84 will be referred to hereinafter as the idler gears. The gears 76 and 78 and 84 serve to transmit a portion of the torque applied to the cage by the planetary gears 68 from the cage to the shaft 32 to equalize the torque supplied to the propeller shafts 30 and 32 and cause these two shafts to rotate at a predetermined speed in opposite directions as will be more specifically pointed out in the description of the force diagram illustrated in Fig. 2.

Both propeller shafts 30 and 32 are supported and centered in the gear case 10 by means of a ball thrust bearing 92 disposed between the outer shaft 32 and the forward end of the gear casing. The outer race of this ball thrust bearing may be secured in the gear casing by means of the cap screws 90 which support the fixed cage 88. The inner race is secured upon the shaft 32 by means of a nut 94 which holds the inner race against an annular shoulder 96 provided on the shaft. The centering and the supporting action of the thrust bearing 92 is transmitted to the inner shaft 30 through the outer shaft 32 and the ball thrust bearing 44. Lubricant or hydraulic fluid may be supplied to the space between the two propeller shafts by means of an oil collector ring 98 mounted upon the fixed cage 88 and overlying the inner ends of the pins or axles 86. The lubricant or hydraulic fluid may be led to the collector ring through suitable channels provided in the fixed cage 88 and is led through suitable apertures 100 in the ring to a channel 102 in the inner side of the ring from which it is led through apertures 104 in the outer shaft to the space between the shafts. Seal rings 106 are provided at each side of the collector ring between the ring and the outer shaft and a plain bearing 108 between the two propeller shafts serves as a seal to prevent the lubricating or hydraulic fluid from leaking out of the space between the shafts at the rear end of the space.

Figure 2:
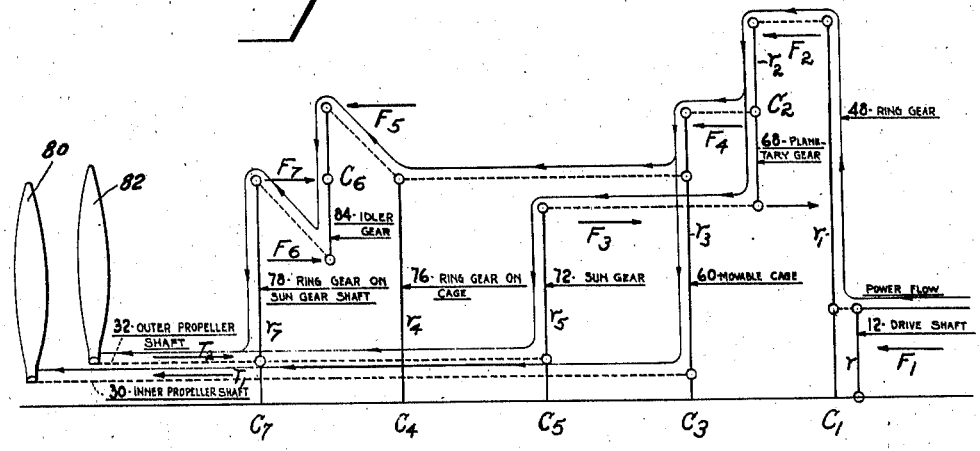
Fig. 2 is a diagrammatic illustration showing the power distribution through the gear unit and the forces acting upon the various elements of the gear train.

Referring now to Fig. 2, the heavy vertical lines refer to various elements of the gear train illustrated in Fig. 1, and the dotted lines represent imaginary links between these various gear elements. The figure represents an instantaneous force analysis of the gear train and the forces have been considered as applied in a direction to rotate the various gear elements toward the left about their various centers indicated as C1, C2, C3, etc. The continuous light line represents the flow of power or the power distribution through the various gear elements, and the arrows labeled F, F1, F2, etc. indicate the forces acting upon the teeth and mounting pins of the various elements. The arrows labeled T1 and T2 indicate the torque applied to the respective propeller shafts.

Considering first the power distribution, it will be observed that the power flow originates, for the purpose of this disclosure in the drive shaft 12, and flows through the ring gear 48 to the outer portion of the planetary gears and only one of the plurality of idler gears is considered. From the outer portion of the planetary gears the power flows to the cage carried pin 74, and to the inner portion of the planetary gear and from thence to the sun gear 72 from which it flows to the outer propeller shaft 32. The power flowing to the cage carried pin is divided, a portion thereof flowing through the cage to the inner propeller shaft 30, and another portion flowing to the beveled ring gear 76 and from there through the reversing idler gear 84 to the beveled ring gear 78, from whence it flows to the outer propeller shaft 32 and is added to the power transmitted to this propeller shaft through the sun gear 72.

The tooth and pin loads are represented by the arrows and their definitions have been indicated by symbols placed beneath the various arrows indicating the forces. The first force essential to this construction is the force F2 exerted by the ring gear upon the outer portion of the planetary gear and this force is shown to be considerably less than the corresponding force F1 exerted by the drive shaft 12 for the reason that $F_2 = F_1(r/r_1)$, and the factor $$\frac{r}{r_1}$$

is less than 1. This force F2 is also, of course, proportional to the number of planetary gears used in the gear train, the construction thus tending to keep the tooth loads between the ring gear and the planetary gears very low. As the planetary gear is free to rotate about its axis the load F3 between the inner portion of the planetary gear and the sun gear 72 will be the same as the load F2 between the ring gear and the outer portion of the planetary gear, and will be correspondingly low. The force F4 exerted by the planetary gear upon the cage carried pin 74 will be equal to the sum of the loads F2 and F3 between the planetary gear and the ring gear and the sun gear, but this force is divided before it is applied to any other gear element and only the portion indicated at F5 is applied to the idler gear 84. This force which is equal to the portion of the drive shaft force F1 determined by the number of idler gears times $$\frac{r}{2r_4}$$

is also quite low because the factor $$\frac{r}{2r_4}$$

is much less than 1. Naturally the force F6 applied by the idler gear to the beveled ring gear 78 is the same as the force F5 and is also correspondingly low. The force F7 exerted by the idler gear upon its fixed pin 86 will be the sum of the forces F5 and F6, since the idler gear is free to rotate about its maintaining pin. Thus, because the ring gear has a large radius and the planetary gears are mounted upon a movable cage, the tooth loads between the ring gear and the planetary gears will be low and, because the force transmitted from the planetary gears to the inner propeller shaft goes directly through the pins 74 and cage 60 without involving any additional gears and because the force transmitted from the planetary gears to the outer propeller shaft 32 is divided so that a portion of it goes through the sun gear 72 and another portion goes through the beveled ring gears 76 and 78, and the idler gear 84, the tooth loads on all of the gears are maintained at very low values. The beveled ring gears 76 and 78 are made with the maximum diameter possible in view of the restrictions imposed by the shape of the gear case 10 so that the tooth loads between these ring gears and the idler gears may be further decreased.

For a gear train of the form illustrated the forces acting on the various gears and the resulting torques imposed on the propeller shafts may be stated as follows:

$F_1 =$ Force exerted by drive shaft divided.
$F_2 = F_1(r/r_1)$
$F_3 = F_2$
$F_4 = F_2 + F_3$
$F_5 = F_1(r/2r_4)$
$F_6 = F_5$
$F_7 = F_5 + F_6$—Where the two propellers rotate at the same speed in opposite directions.
$T_1 = F_4 r_5 - F_5 r_4$
$T_2 = F_3 r_5 + F_6 r_7$ From the above description, the relation of the various gear elements to each other will be clearly apparent and it will also be observed that by means of the form of gear train illustrated, the two coaxial propellers will be rotated in timed relation with respect to each other in opposite directions, and at the same time the tooth loads on the various gears will be maintained at an extremely low value. Also the particular distribution of forces permits the use of relatively small light gear elements arranged in a compact manner to provide a light unit of small dimensions for the purpose indicated.

The nose section 10 is separable from the engine along with the partition 24, both of these elements being detachably secured to the engine by suitable means such as the cap screws 110. The propellers, the propeller shafts 32 and 34, and the entire gearing assembly are carried by the nose section and the partition 24 so that the entire propeller and gear unit may be removed from the engine with the nose section and may be assembled in the nose section and applied to the engine as a unit.

While there has been illustrated and described a particular mechanical embodiment of the idea of the invention, it is to be understood that the invention is not limited to the particular mechanical embodiment so illustrated and described, but that such changes in the size, shape, and arrangement of parts may be resorted to as come within the scope of the appended claims.

As the invention has now been described so that others skilled in the art may clearly understand the same, what it is desired to secure by Letters Patent is as follows.

I claim:

1. In a combined reversing and reduction gearing for transmitting power from a single drive shaft to a pair of coaxial driven shafts turning in opposite directions at a speed less than the speed of the drive shaft, an external ring gear carried by said drive shaft, a cage carried by one of said driven shafts, a sun gear carried by the other of said driven shafts, planetary gears carried by said cage meshing with said external ring gear and said sun gear, a beveled ring gear carried by each of said driven shafts, and beveled pinion gears mounted to turn about fixed axes meshing with said beveled ring gears.

2. In a combined reversing and reduction gearing for transmitting power from a single drive shaft to a pair of coaxial driven shafts turning in opposite directions at a speed less than the speed of the drive shaft, a ring gear on said drive shaft, planetary gearing between said ring gear and said driven shafts acting on said driven shafts through unequal moment arms to apply unequal torques in opposite directions to said driven shafts, and speed equalizing gearing connected directly between said driven shafts.

3. In a combined reversing and reduction gearing for transmitting power from a single drive shaft to a pair of coaxial driven shafts turning in opposite directions at a speed less than the speed of the drive shaft, a ring gear operatively connected with the drive shaft, planetary gearing between said ring gear and said driven shafts including a planet gear carrying cage on one driven shaft and a planet gear driven inner gear on the other of said driven shafts applying unequal torques in opposite directions to said driven shafts, and speed equalizing gearing connected directly between said driven shafts.

4. In a combined reversing and reduction gearing for transmitting power from a single drive shaft to a pair of coaxial driven shafts turning in opposite directions at a speed less than the speed of the drive shaft, a ring gear on said drive shaft, planetary gearing between said ring gear and said driven shafts applying unequal torques in opposite directions to said driven shafts, and speed timing gearing between said driven shafts, comprising, a beveled ring gear on each shaft, and a beveled pinion mounted on a fixed pin meshing with said beveled ring gears.

5. In a combined reversing and reduction gear for transmitting power from a single drive shaft to a pair of coaxial driven shafts turning in opposite directions, a planetary gear train comprising a ring gear driven by the driven shaft, planet gears supported on one driven shaft, and a sun gear on the other driven shaft, for receiving power at high speed and low tooth loads from said drive shaft and dividing said power between said driven shafts so that the major portion of the power is transmitted through the bearing pins of said planetary gears to one of said driven shafts and a minor portion thereof is transmitted through the gear teeth to the other of said driven shafts, and a second set of gears between said driven shafts for equalizing the power supplied to said shafts from said drive shaft.

GEORGE L. WILLIAMS.